April 3, 1973   HANS-DIETER STENZEL   3,725,162
METHOD AND EQUIPMENT FOR COMPLETING CONNECTION OF CABLE ENDS
Filed June 2, 1970

INVENTOR:
Hans-Dieter Stenzel

ATTORNEYS

United States Patent Office 3,725,162
Patented Apr. 3, 1973

3,725,162
METHOD AND EQUIPMENT FOR COMPLETING CONNECTION OF CABLE ENDS
Hans-Dieter Stenzel, Hannover, Germany, assignor to Kabel- und Metallwerke Gutehoffnungshutte Aktiengesellschaft, Hannover, Germany
Filed June 2, 1970, Ser. No. 42,752
Claims priority, application Germany, June 14, 1969, P 19 30 303.8
Int. Cl. H01b 13/08
U.S. Cl. 156—53
14 Claims

ABSTRACT OF THE DISCLOSURE

Insulating tape is wrapped around interconnected conductor ends from which insulation has been removed, and the tape wrapping is welded through non-uniform heat application to obtain gradually sloping temperature drop toward adjoining original insulation, to inhibit local accumulation of chemically active migrating substances.

---

The present invention relates to method and apparatus for completing interconnection of cable ends, particularly for a high voltage cable system. In case two cable ends have to be interconnected it is customary to proceed as follows. The cable is usually comprised of a conductor insulated by means of thermoplastic material such as polyethylene. The insulation layer is removed from the cable ends, and particularly conical points are provided. The bared conductors of the two cable ends are interconnected through soldering, welding or pressing. The joint is smoothed by wrapping a conductive plastic tape around the joined conductor ends. Subsequently, plastic tape, e.g., polyethylene tape or the like, is wrapped around the interconnected conductors to restore continuous insulation along the cable.

The several layers of the polyethylene wrapping should fuse and, thus, have to be welded to each other as well as to the adjoining original cable insulation that was not removed. This welding step for completing the connection is particularly necessary to eliminate formation of cavities in between the several layers, particularly where overlapping with the conical shaped contour of the adjacent original insulation. Thus, the several tape layers are caused to fuse to establish a more or less compact and integral insulating collar around the conductors, which is also welded to the original insulation of the cable.

The insulation tape is welded through heat application by means of a mobile heater or through heating conductor tapes wound upon the newly insulated cable portion so as to obtain rather concentrated heat application. Accordingly, there is a rather hot welding zone from which temperature drops off rather steeply, whereby particularly the original insulation adjacent the new insulating collar remains cold, equivalent to quasi-temperature discontinuities. It was found that such a concentrated heat application gives rise to considerable problems. This is particularly, so, if the cable was already in use and if there was already a connection of the type described; the connection may have become defective and had to be renewed. After having proceeded as aforedescribed, frequently the cable became defective again, not in the renewed connection itself, but right next to it. An analysis showed that it is particularly the fusion zone of original insulation and of the newly made insulation collar that becomes defective.

The invention now relates particularly to cable connections of the type as aforedescribed, and overcomes this particular problem. The invention will find utility wherever a cable end has to be connected to another end or to a cable so as to establish a branch. It is presumed that the respective conductors involved have been conductively interconnected, and that insulation is re-established through layers of insulating foil or tape wrapped around the bared conductors. It is suggested particularly to weld the newly placed insulation tape or foil so that particularly in the region where the "new" insulation wrapping abuts original insulation that was not removed, there is a rather flat temperature gradient. Thus, it is avoided to establish steep temperature gradients between the welding zone proper and the adjacent original cable portions.

It was discovered that during welding of the plastic insulating tape chemically active substances in the tape vaporize. These substances may still be in the tape as residue from the manufacturing process; in case of a polyethylene tape there usually remains some stearin acid and other active substances. These substances are distributed in the insulating material at relatively low and harmless concentration. During welding, i.e. upon heating, the vapor pressure of these substances is increased. To the extent the tape is exposed, some substance may escape, but as there is a multilayer wrapping most of the molecules of this residue remains inside of the presently made collar. Similar process may occur in the original insulation, affecting also particuler surface active components therein. In either case, the mobility of the molecules of these substances is greatly increased by the welding process.

In case of a concentrated localized welding zone, there develops, as stated, a steep temperature gradient. Accordingly, there is a steep gradient in the vapor pressure of these active components. The molecules of these substances tend to migrate through the layers of insulation with a resulting component of motion toward the cooler portions of the cable that is not or little affected by the welding. If the temperature gradient is steep, the vaporized substances will tend to condensate in a limited region and, thus, be accumulated. It was found, that such increase in local concentration produces a "weak" point in the cable. This was found to be particularly so if these substances accumulated in the transition region where the "old" insulation adjoins the "new" one; these regions became particularly susceptible to formations of cracks and fissures.

In accordance with the invention, a steep temperature gradient is avoided, particularly in the transition zone where the newly formed insulation collar is welded to the original cable insulation. This way, migration of active and heated substances is not completely avoided but they are distributed rather uniformly over a relatively larger region that extends from the new insulation to the adjacent original insulation; particularly there will be no localized increase in concentration of the chemically active substances in or near the transition zones, which includes neck portions of the insulation collar. Instead, migrating substances are distributed also in these transition zones at low densities, and formation electrically and/or mechanically weak regions therein is avoided.

For practicing the invention, it is suggested to apply the heat to the region to be welded in a manner that the developed heat gradually tapers off in directions away from the newly formed insulation collar. This requires specifically the extension of heating to adjacent, original insulation, where welding heat is not needed, but such extension of the heating zone is instrumental in flattening the temperature gradient.

As stated, the invention can be practiced upon connecting two cable ends, but branch connections can be handled similarly. Essential is that in and along a cable with presumed completed conductive connection of the respective conductors involved, the insulation as placed over the conductor joint is heat treated in a controlled manner so that the temperature drops off from the principal welding zones gradually, at a flat slope, in directions toward any cable portion more remote from the joint. This temperature control avoids establishing of zones of limited dimensions where the substances condensate; instead, the condensate is rather widely distributed so that there are no local zones of excessive accumulation, particularly where the collar is joined to the original insulation.

The invention may be practiced by employment of a radiation heater developing more or less uniformly strong heat radiation adjacent the bulk of the insulation tape directly over and above the completely bared conductor ends. The radiation intensity declines along the cable axis and gradually tapers off, particularly where affecting the two necks of the collar and the corresponding tapered portions of the original insulation and beyond. Alternatively, a heating conductor tape can be wound helically on top of the newly wrapped insulation tape but extended toward adjoining regions of original insulation. The spacing of the helical windings of the heating conductor is not uniform but increases in direction away from the collar about to be formed.

Non-uniform heat development and a flat temperature gradient for a gradually falling off of the temperature toward the cable remote from the joint can be obtained generally through appropriate non-uniform construction of the heating equipment to obtain spatial gradation in the heat flow toward and into the insulation of cable. Alternatively, gradation, development and production of thermal energy may be obtained through sectionalizing the heating equipment and/or appropriately controlling the current flow. Still alternatively, the heat development itself does not have to provide for a temperature distribution with a small gradient. Instead, the flow of thermal energy distribution may be controlled.

For example, a thermal conductor may be interposed between a centrally located heat source and the insulation wrapping, to extend beyond the wrapping, so that some of the thermal energy is laterally conducted away from the joint-near region of immediate exposure and toward more remote portions of the cable. The temperature gradient in the entire insulation at and near the joint is essentially determined by the resulting heat flow and temperature gradient in the distributor. The thermal energy itself will be developed as aforedescribed, by a radiation heater or by thermal conductors wound on top of the distributor. In this case, neither the heater nor the conductor need to have any non-uniform configuration.

In an alternative embodiment, a heating sleeve in form of a metal foil may be wrapped around the insulation wrapping, but extending axially over adjacent original insulation of the cable. That sleeve is now heated by means of induction heating, and in a non-uniform manner to establish the desired flat temperature drop toward and into the original cable insulation.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
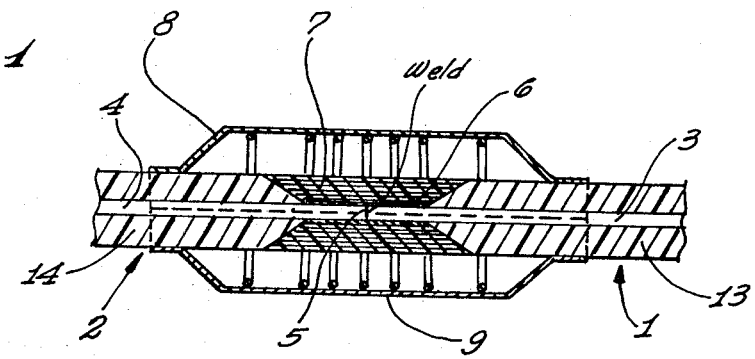
FIG. 1 illustrates cross section view through an end-to-end cable joint, together with a particularly constructed heat source for insulation welding to obtain temperature gradation along the cable.

Proceeding now to the detailed description of the drawings, in FIG. 1 thereof is illustrated a cable connection of and within a high voltage cable. The cable includes particularly the two cable ends 1 and 2, respectively having conductors 3 and 4 and insulation 13 and 14.

Previously, the cable may have been a single, uninterrupted string, but there may have been a local failure so that the broken ends must be reconnected, or a substitute cable section has to be spliced in. In either case, two cable ends to be connected have been prepared by tapering the insulation 13 and 14 at the ends to obtain conical points and by baring the end portions of the conductors 3 and 4. The conductor ends have been interconnected, for example, by means of soldering, welding or the like for forming a joint 5.

In order to improve the connection and in order to smooth the surface of the conductive path between the ends of conductors 3 and 4, these exposed ends are wrapped in an electrically conductive plastic tape to obtain a smooth, conductive sleeve 6, in order to reestablish insulation, polyethylene foil 7 has been wrapped around the conductors to obtain a multi-layer insulation collar. The foil 7, in effect, serves as substitution for the previously removed insulation.

In order to avoid formation of cavities in between the several layers of foil and particularly between overhung foil ends adjacent the tapering portions of insulation 13 and 14, the several layers of insulation foil have to be welded together, to establish a single piece collar. Also, that collar has to be welded to the original insulation 13 and 14 so that the completed cable has uniform insulation structure. Conversion of the multi-layer insulation package into a single piece collar by fusing adjacent layers, is also advisable because the insulation extends to have physical contact with the conductors. It has to be observed that there is maximum electric field strength around the conductors directly adjacent the closest insulation layer.

In the embodiment illustrated in FIG. 1, the several layers of foil 7 are welded by means of an electric radiation heater 8 which is preferably constructed as a two part heater, having two complementary parts which can be placed so as to completely envelop a particular axial section of the cable. The heater is removable from the particular location on the cable after completion of welding.

The heater 8 is now constructed to particularly carry out the critical feature of the invention. As schematically indicated, the heater includes a heating conductor 9 that is, for example, wound helically around the inner surface of the housing of the furnace. The conductor 9 may include plural connectors to permit unplugging and removal of the two heater parts. Alternatively, the heating conductor may comprise plural semicircle sections electrically connected in parallel in each of the two parts of this two part heater.

In either case, one can see that there are plural windings of heating conductors, and the spacing between adjacent the windings is not uniform along the axial extension of the heater; the windings are closer to each other in the central portion of the heater (along the cable axis) than near the axial end portions thereof. Or, to state it differently, the heating conductor portions are more densely placed adjacent the principal, thickest portion of insulation wrapping than adjacent cable portions from which the insulation was not removed. On the other hand, it is important that the heater *does* extend to cover part of the original insulation 13, 14.

It follows from the foregoing that upon operation of this particular heating arrangement maximum heat is applied to the insulating foil wrapping as it extends directly around joint 5 and around the adjacent conductor portions from which insulation has been removed. The heat has to penetrate to greatest depth in this particular region. Heat application is somewhat reduced in the boundary zone between foil wrapping 7 and the original insulation 13 and 14. Some heat is developed in adjacent regions of the original uncut insulation, not for welding but for flattening the slope of the temperature distribution curve.

Generally, it may be presumed that the cable has already been used (for example, the conductor was broken for any reason and has been repaired in that particular manner, by rejoining the broken ends, or a new portion has been spliced in or the like). Therefore, in one or both cable ends most of the surface active material therein had probably escaped and the remainder has assumed a particular distribution. The new insulation wrapping 7, however, may still contain such substances at a somewhat higher concentration.

Due to heating these substances tend to vaporize in the interior of the wrapping and will tend to migrate, on the average, toward cooler portions of the insulation. It must be avoided that these substances condensate and accumulate locally resulting in relative high concentration. Most particularly, such concentration and accumulation must be avoided in the inherent discontinuity or boundary zone between "fold" and "new" insulation.

The controlled reduction in heat application establishes a flattened drop in temperature in the insulation corresponding to a small temperature gradient. Particularly, the heating zone is extended to portions of the original insulation of the cable, beyond the insulation taper. As a steep local temperature drop is not established in and adjacent the boundary between the insulation foil wrapping to be welded and the initial insulation, mobile and chemically active material will not accumulate in that particular region. Generally speaking, these chemically active substances are not locally concentrated by the welding process.

Figure 2:
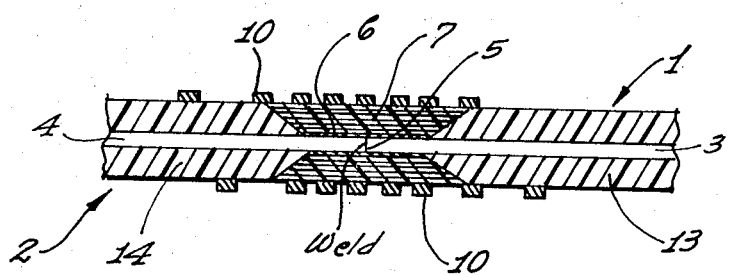
FIG. 2 illustrates similarly a modified version for obtaining non-uniform heating for insulation welding.

Turning now to the embodiment of FIG. 2, there is shown a different mode of avoiding a steep temperature gradient particularly as between welding zone of the polyethylene foil wrapping and adjoining cable. Again, means are provided to establish non-uniform heating without incurring quasi discontinuities in the process along the cable. In this particular embodiment a heating conductor tape 10 is wound on top of the insulation wrapping 7, but the heating conductor extends also to the adjoining initial insulation. This heating conductor has helical configuration, and the windings are rather closely spaced above foil 7 while adjoining windings are farther apart, particularly where wound upon the original insulation. As current flows through conductor tape 10, foil 7 is heated for welding and the temperature tapers off gradually, away from the joint where having its original configuration.

The FIG. 2 aids also in the understanding of practicing the method of the invention in accordance with a still different arrangement. Heating conductors can be wound at uniform spacing all around the insulation wrapping as well as around adjacent insulation 13 and 14. However, the heating conductors wound directly on the wrapping 7 have higher output of thermal energy on a per unit length basis, than conductors wound on insulation 13 and 14, either by driving the conductors with different currents, or providing intermittent current flow in the conductors that heat the original insulation, or by choosing different types of heating conductors for the differing portions.

Figure 3:
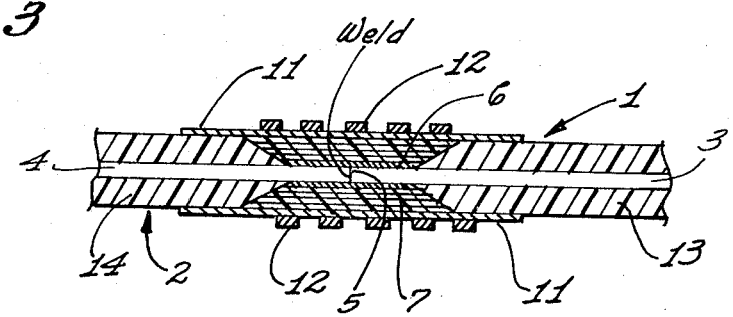
FIG. 3 illustrates similarly obtaining of a low temperature gradient through interpositioning of a heat distributor.

In the embodiment of FIG. 3, joint 5, conductive sleeve 6 and foil wrapping 7 are provided as aforedescribed. Previously it was customary to provide a shrinkable sleeve or hose over such a joint. Instead, metal tape 11 is wrapped around foil 7 as well as around the adjoining original insulation of cable ends 1 and 2. The tape 11 establishes a tubular envelope and is made of copper or aluminum. This tape 11, as so placed, shapes the outer configuration of the cable joint to establish a smooth transition from cable end 1 to cable end 2. Additionally, this metallic envelope provides for temperature equalization.

Thermal energy is applied to central portions of the envelope 11, quite possibly through more or less uniform heating. As the axial end portions of envelope 11 are not heated directly, but receive thermal energy through lateral (axial) flow, the original insulation is, again, heated less than the bulk of the tape 7.

For example, the heating tape 10 is wound on the sleeve or tube made from tape 11. The windings of tape 10 may be non-uniformly spaced as in case of FIG. 2. However, FIG. 3 shows that heating conductor 10 is wound at equidistant spacing on envelope 11. Moreover, the axial length of tube 11 is larger than the length of the resulting heating coil as formed by conductor 10. These protruding portions of envelope are a good heating conductor, a significant amount of thermal energy will flow therein, to heat the adjoining insulation, though less than the tape 7 underneath the heater coil is heated.

Thermal energy may be developed in envelope 11 otherwise, serving as heating sleeve. Inductive current may be developed in the central portions of envelope 11, and axial portions are heated either through axial conduction as above, or through inductive heating at lower intensity or by a combination of both.

The invention is not limited to the embodiments described above but all changes and modifications thereof not constituting departures from the spirit and scope of the invention are intended to be included.

I claim:

1. Method of completing connection of the end of a high voltage cable to another high voltage cable for preventing insulation breakthrough in or near the connection, each cable having thermoplastic insulation, but insulation of conductor portions to be connected having been removed, and the conductors having been joined through welding, soldering or the like, and wherein thermoplastic insulating tape has been wrapped around the joint conductors, comprising the steps of applying maximum heat to the tape wrapping, for welding the wrapped tape adjacent the joint conductors; and of extending the application of heat beyond boundaries between the wrapped tape and the adjacent, original cable insulation of both cables, but applying a lesser amount of heat to the original cable insulation so that the welding energy as applied gradually tapers off from the region of application of maximum welding heat to the unimpaired insulation of the cable portions adjoining the respective ends, for flattening the temperature gradients in these cable portions.

2. Method as in claim 1, the heating and welding step preceded by providing and using heating means adjacent to and along the wrapping and adjoining cable surface areas of original insulation thereof, the heating means constructed to provide thermal outputs differing in axial direction on a per unit length basis to obtain said temperature gradient, including particularly a gradual temperature drop across the boundary between the wrapping and the original insulation.

3. Method as in claim 1, including the step, preceding the heating and welding step, of wrapping a heat conductive foil around the insulation wrapping as well as around adjoining cable surface areas of original insulation, to establish an axially continuous envelope, and providing thermal energy to the foil adjacent the wrapping only.

4. Method as in claim 3, the heating and welding step further preceded by the step of winding a heating conductor around the foil as wrapped adjacent the wrapping for the foil to serve as thermal conductor for distributing heat to the insulation axially beyond the wound conductor and upon flow of electric heating current through the heating conductor for welding.

5. Method as in claim 3, the heating and welding step including the step of developing induction current in the foil at differing intensity along the cable axis.

6. Method as in claim 1, the heating and welding step preceded by winding a heating conductor at non-uniform spacing of the winding, around the wrapping and as well as wound adjoining original insulation of the cable.

7. Method as in claim 1, the heating and welding step comprising the step of heating the insulation wrapping and adjoining regions of original cable insulation by radiant energy, the radiant energy intensity as applied differing in longitudinal direction, and declining from the region of the insulation wrapping itself, across the boundaries with the original insulation and covering adjacent parts of the original insulation.

8. Equipment for completing connection of the end of a high voltage cable to another high voltage cable, each cable having thermoplastic insulation but insulation of conductor portions to be connected having been removed and the conductors having been joined through welding, soldering or the like, and thermoplastic insulation tape has been wrapped around the joint conductors, comprising means for heating the tape wrapping for welding the tape and including means (a) for providing maximum application of thermal energy for producing maximum welding heat in the wrapped tape adjacent the joint conductors, and further including means (b) extending heating to adjacent original cable insulation with gradual tapering off of welding energy as applied for establishing a flat temperature gradient along the cable, from the region of application of maximum welding heat across the boundary to the unimpaired insulation of the cable portions adjoining the respective ends.

9. Equipment as in claim 8, the heating means disposed adjacent to and along the wrapping as well as adjoining cable surface areas of original insulation thereof, the heating means constructed to provide thermal output, differing in axial direction on a per unit length basis, to obtain said temperature drop across the boundary between the wrapping and the original insulation.

10. Equipment as in claim 8, the heating means comprising a two-part heating device disposed to envelop the tape to be welding and adjoining cable regions and providing non-uniform heating, at a declining rate along the cable axis.

11. Equipment as in claim 10, the heating device having non-uniformly spaced heating elements, the density of spacing having maximum value adjacent the wrapping and declining toward adjacent original cable insulation.

12. Equipment as in claim 8, the heating means constituted by a heating conductor wound around the insulation wrapping.

13. Equipment as in claim 12, the flat temperature gradient established by a heat distributing layer interposed between the heating conductor and the wrapping and extending to adjoining cable surface areas of original insulation.

14. Equipment as in claim 12, the flat temperature gradient established through extension of the heating conductor to adjoining original cable insulation at larger spacing of winding than on the wrapping.

References Cited
UNITED STATES PATENTS

| | | | |
|---|---|---|---|
| 2,287,163 | 6/1942 | Bishop | 156—49 |
| 3,356,551 | 12/1967 | Glen et al. | 156—49 |
| 2,882,333 | 4/1959 | Bertaux | 156—49 |
| 2,161,447 | 6/1939 | Bishop | 156—51 |
| 1,881,785 | 10/1932 | Malm | 156—49 |
| 3,127,291 | 3/1964 | Betz | 174—84 |

BENJAMIN A. BORCHELT, Primary Examiner

H. J. TUDOR, Assistant Examiner

U.S. Cl. X.R.

156—272, 380